(12) United States Patent
Garnier

(10) Patent No.: US 8,783,954 B2
(45) Date of Patent: Jul. 22, 2014

(54) SLIDING BEARING SHELL COMPRISING A COLLECTING GROOVE

(75) Inventor: Thierry Garnier, Koengernheim (DE)

(73) Assignee: Federal-Mogul Wiesbaden GmbH, Wiesbaden (DE)

(*) Notice: Subject to any disclaimer, the term of this patent is extended or adjusted under 35 U.S.C. 154(b) by 0 days.

(21) Appl. No.: 14/004,505

(22) PCT Filed: Feb. 16, 2012

(86) PCT No.: PCT/EP2012/052664
§ 371 (c)(1),
(2), (4) Date: Sep. 11, 2013

(87) PCT Pub. No.: WO2012/123213
PCT Pub. Date: Sep. 20, 2012

(65) Prior Publication Data
US 2013/0343682 A1    Dec. 26, 2013

(30) Foreign Application Priority Data
Mar. 11, 2011 (DE) .......................... 10 2011 005 467

(51) Int. Cl.
F16C 33/10 (2006.01)
F16C 33/02 (2006.01)
F16C 9/02 (2006.01)

(52) U.S. Cl.
CPC ............ *F16C 33/02* (2013.01); *F16C 33/1065* (2013.01); *F16C 9/02* (2013.01)
USPC ............................ 384/286; 384/288; 384/291

(58) Field of Classification Search
USPC .................. 384/283, 284, 286, 288, 291–294
See application file for complete search history.

(56) References Cited

U.S. PATENT DOCUMENTS

| 1,940,301 | A | * | 12/1933 | Grobel et al. ................. 384/291 |
| 1,948,340 | A | * | 2/1934 | Dolza et al. ................... 184/6.5 |
| 2,004,254 | A | * | 6/1935 | Taub ............................. 384/288 |
| 2,697,017 | A | * | 12/1954 | Evans ........................... 384/291 |
| 2,901,297 | A | * | 8/1959 | Sternlicht .................... 384/291 |
| 3,881,788 | A | | 5/1975 | Kotauczek |
| 4,105,267 | A | * | 8/1978 | Mori ............................ 384/291 |
| 7,234,870 | B2 | * | 6/2007 | Kitahara et al. ............. 384/288 |
| 2005/0196084 | A1 | | 9/2005 | Kitahara et al. |

FOREIGN PATENT DOCUMENTS

| DE | 2305834 A | 8/1974 |
| DE | 3621577 A1 | 2/1987 |
| DE | 3825449 A1 | 6/1989 |
| DE | 10163292 A1 | 7/2002 |
| DE | 60025423 A1 | 7/2006 |
| DE | 102005037502 A1 | 3/2007 |
| DE | 102005011371 B4 | 8/2007 |
| DE | 102006010698 A1 | 9/2007 |
| DE | 102008008584 A1 | 8/2009 |
| EP | 1557544 A1 | 7/2005 |
| FR | 2910087 A1 | 6/2008 |
| GB | 2350652 A | 12/2000 |
| WO | WO 02/063143 A1 * | 8/2002 ............... F01M 1/06 |

* cited by examiner

*Primary Examiner* — Phillip A Johnson
(74) *Attorney, Agent, or Firm* — Robert L. Stearns; Dickinson Wright, PLLC

(57) ABSTRACT

The present invention relates to a sliding bearing shell comprising an oil bore (16) which radially penetrates the sliding bearing shell for introducing oil in the sliding bearing shell, wherein one or more collecting grooves (18), which extend on the inner side (14) of the sliding bearing shell (10) in the circumferential direction, are provided for collecting the oil present in the sliding bearing shell, the grooves being surrounded completely and all the way around by a supporting surface (20).

11 Claims, 5 Drawing Sheets

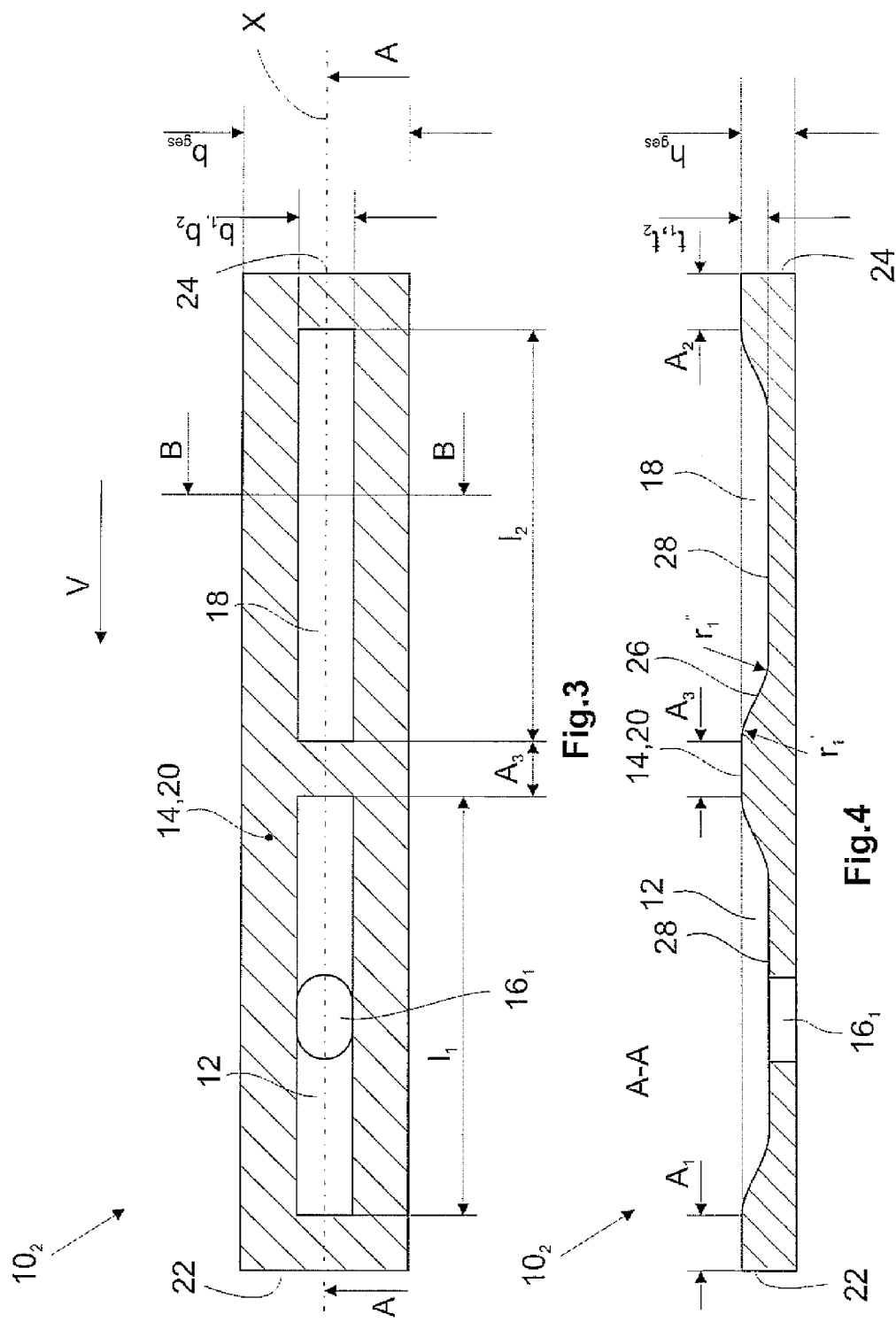

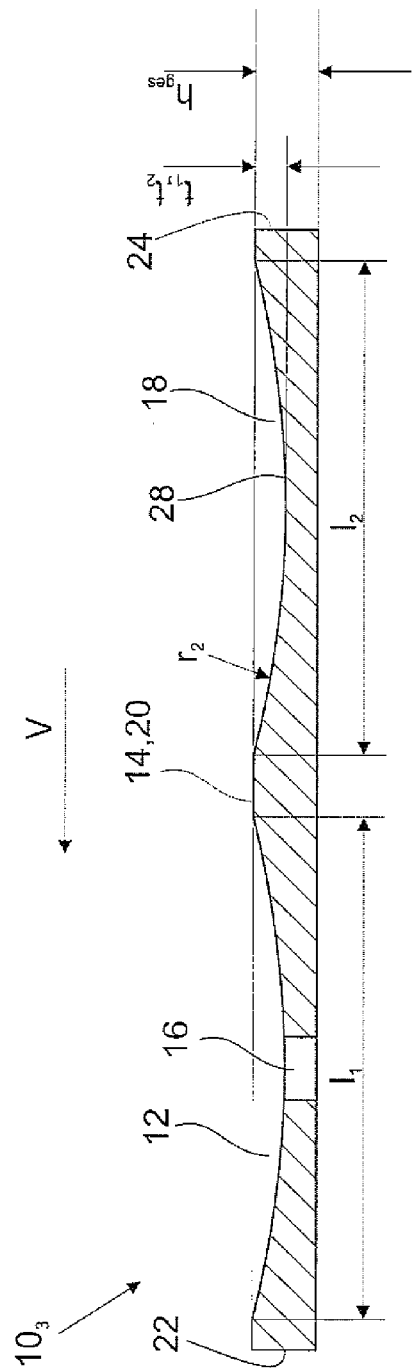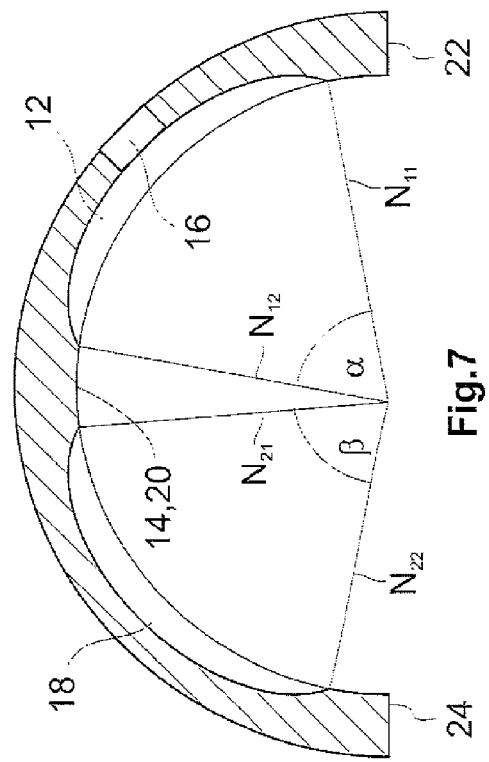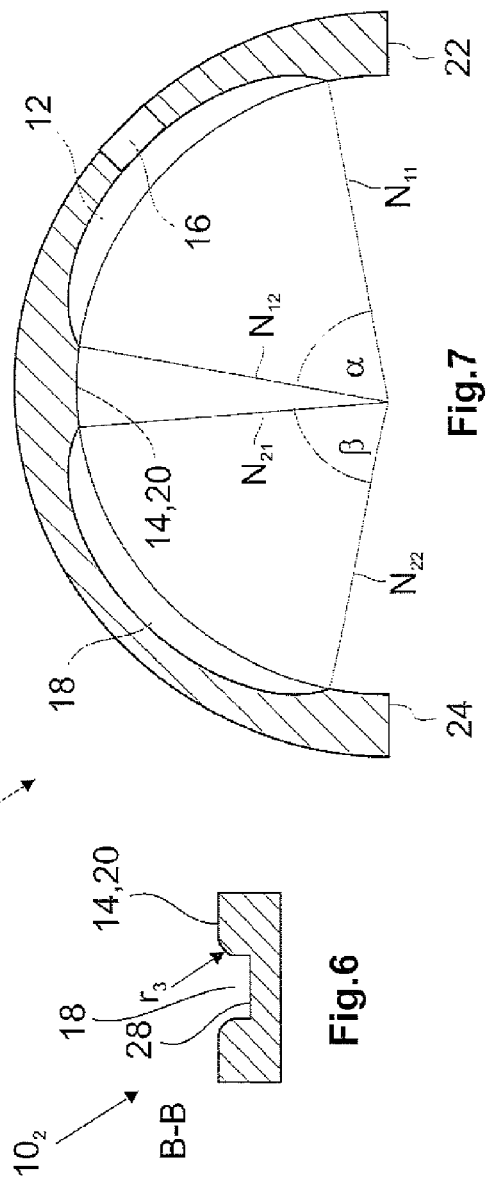

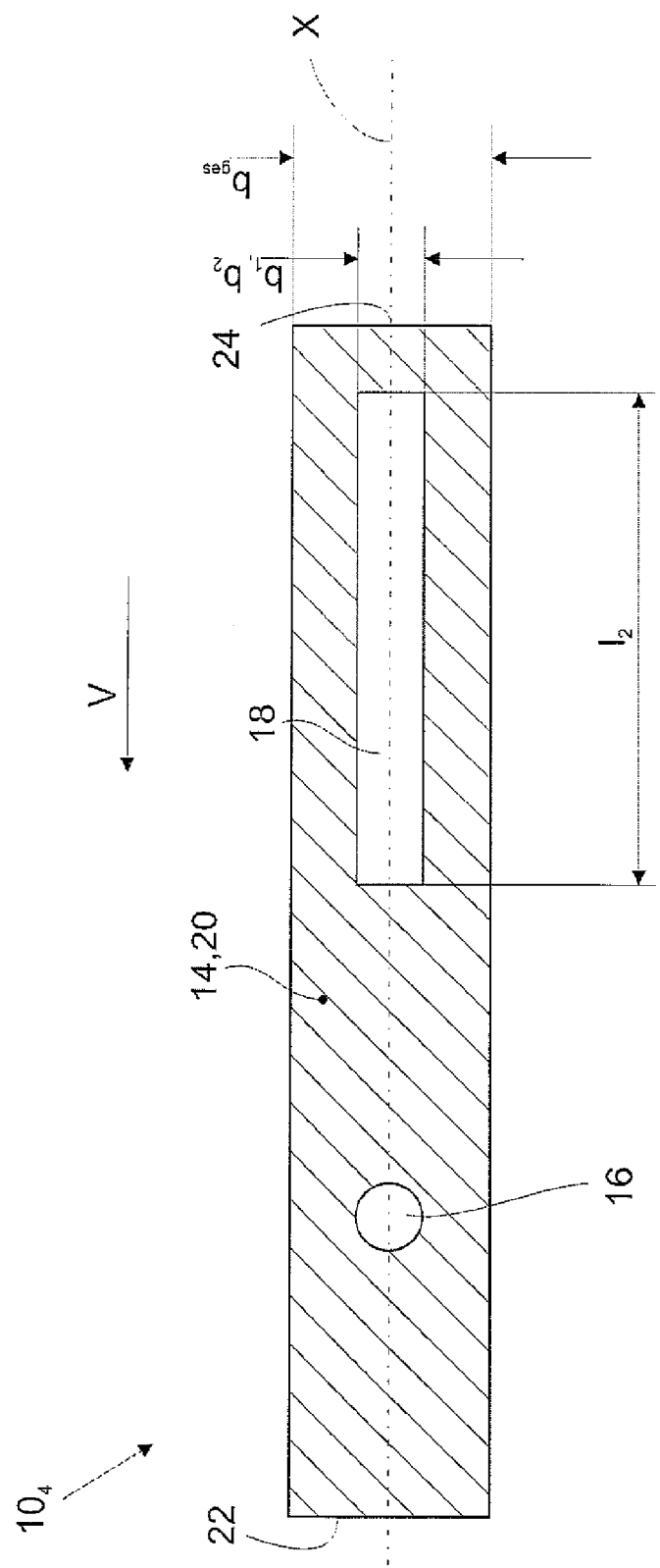

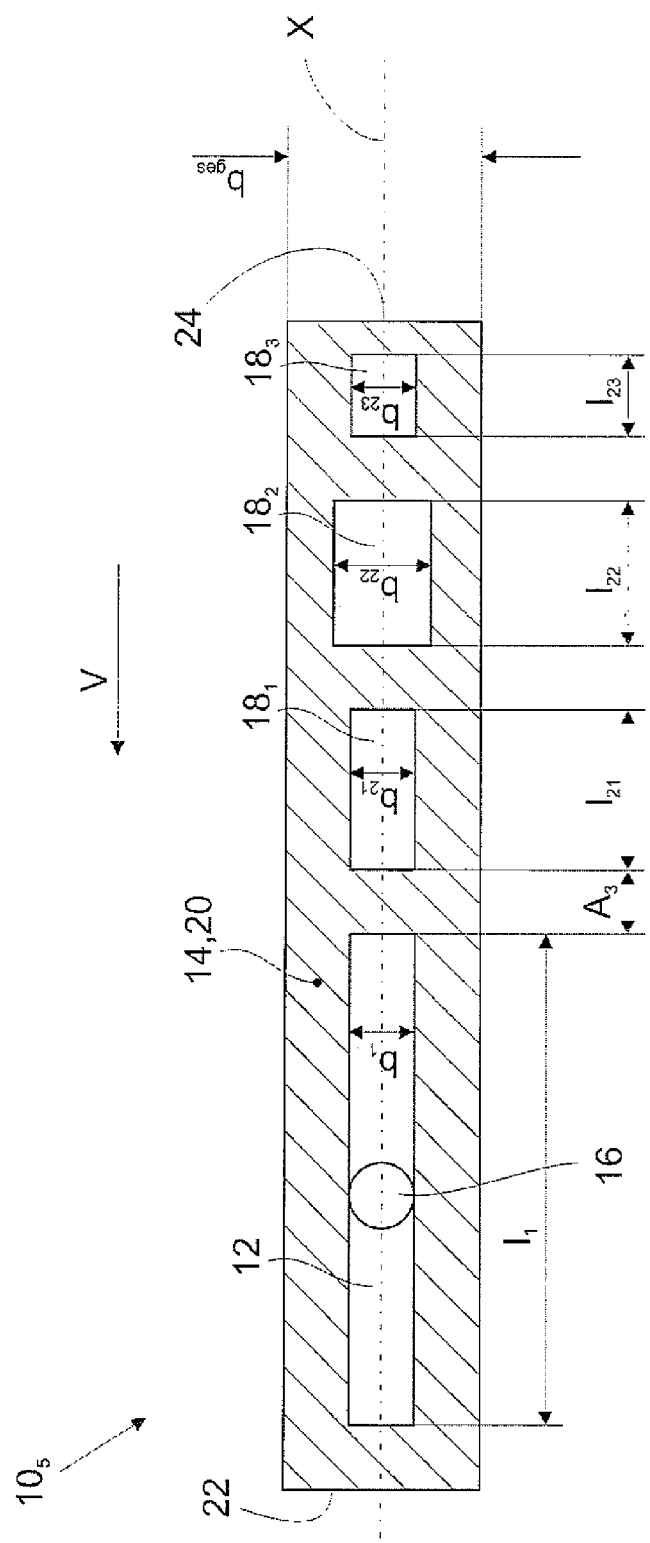

SLIDING BEARING SHELL COMPRISING A COLLECTING GROOVE

BACKGROUND OF THE INVENTION

1. Technical Field

Figures 1, 2:
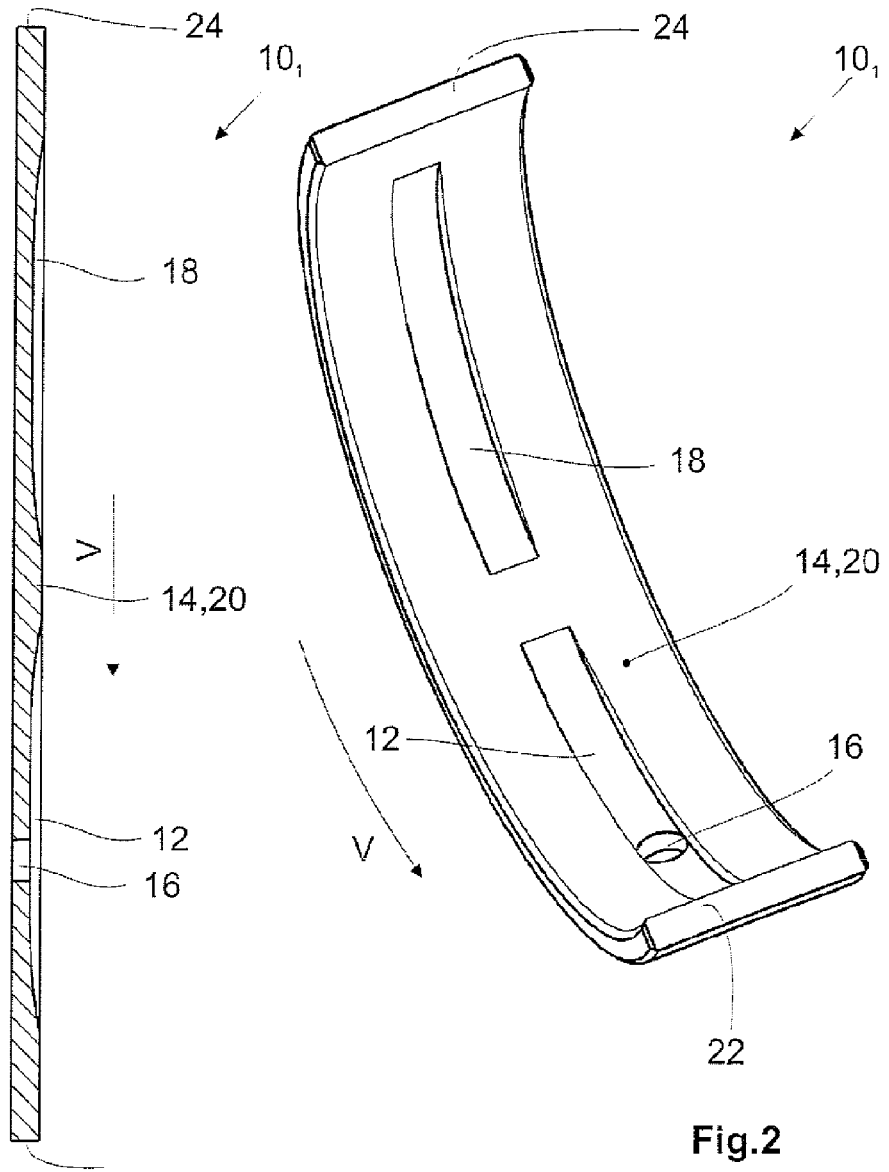

This invention relates to a bearing shell with an oil bore which passes radially through the plain bearing shell to insert oil into the plain bearing shell.

2. Related Art

Typical applications of the generic plain bearing shell are the crankshaft main bearing, the connecting rod bearing or bushings in internal combustion engines. Generic plain bearing shells are known from the DE 10 2005 037 502 A1 or DE 101 63 292 A1, for example.

Typically, two of such plain bearing shells form a plain bearing, wherein the mounted shaft slides on an oil film, which forms on the inside of the plain bearing shell between the shaft itself and the load-bearing surfaces. In order to ensure the formation of this oil film between the load-bearing surface and the inner shaft, oil is inserted through the oil bore in the plain bearing shell, and in particular injected. The oil is distributed in the plain bearing shell and lubricates the load-bearing surfaces, upon which it is driven by the rotating shaft, whereby the oil film is formed, on which the shaft slides.

In addition to the formation of the oil film, the oil cools the plain bearing, whereby it dissipates the heat generated during the operation of the bearing. The ambient operating temperatures are between 90° C. for normal applications up to 210° C. in extreme applications, such as in racing cars. About ¾ of the amount of oil injected in the plain bearing shell is used for cooling.

The oil is injected into the plain bearing shell by means of an oil pump. The oil pump is driven by a motor that drives the vehicle. A part of the power delivered by the engine is required to drive the oil pump. The amount of the power required for driving the oil pump can be reduced by reducing the volumetric flow rate of the oil through the oil bore. With a reduction of the amount of power that is needed to drive the oil pump, engine fuel consumption and therefore the $CO_2$ emissions will be reduced, also.

Some plain bearing shells have oil grooves, by which the oil is distributed inside the bearing shell. The volumetric flow rate is proportional to the surface of the oil groove, so, for the reasons provided above, the aim is to shape the oil groove as low as possible. The plain bearing shell encloses typically an angle of 180° in circumferential direction, so that two plain bearing shells completely surround the shaft to be mounted. The oil groove can go through the entire plain bearing shell so that it also covers an angle of 180° in the circumferential direction. In order to reduce the oil groove surface and therefore the volumetric flow rate of the oil through the oil groove, the angle can be reduced. There are plain bearing shells known having an oil groove with an angle of 150°, and even angles of 120° are tested. However, it has to be taken into account, that the volumetric flow rate through the oil groove is not reduced overly, to ensure a sufficient cooling.

By reducing the angle of the oil groove the required amount of oil has to be inserted into the plain bearing through a reduced surface and the oil has to be distributed over a larger surface in order to ensure an unobjectionable mounting. This leads to an increasing amount of the oil emerging from the bearing side and being lost. Usually a significantly larger amount of oil is inserted into the bearings as actually needed to ensure the unobjectionable mounting of the shaft and to prevent a failure. In order to procure the necessary volumetric flow rate, the engine must provide a higher power to the oil pump, which increases the fuel consumption of the engine.

SUMMARY OF THE INVENTION

The object of this invention is therefore to reduce at least the above-mentioned disadvantages the of generic plain bearings and to specify a plain bearing whereby the oil located in the plain bearing shell can be used more efficiently, so that the proportion of the engine power required for the oil pump and at the same time the lateral discharge from the bearing shell can be reduced.

The object is solved by a collecting groove which extends on the inside of the plain bearing shell in circumferential direction to collect the oil located in the plain bearing shell, which is closed and surrounded on all sides by a load-bearing surface. A closed collecting groove is a groove into which no oil bore leads. The closed collecting groove creates a cross-sectional enlargement inside the oil film, thus a larger closed volume in the area of the collecting groove is available for the oil, so that there is generated a negative pressure in the collecting groove. Thus, in the area of the collecting groove, where the negative pressure is applied, a suction effect is created so that oil is suck into this area of the collecting groove and a flow towards the collecting groove is created in the oil film. The amount of oil that leaks laterally from the plain bearing is therefore reduced and the oil is used again, so that the volumetric flow rate transported by the oil pump into the plain bearing shell can be reduced also. Preferably, the collecting groove is arranged in rotational direction of the shaft to be mounted in front of the oil bore so that the collected oil may be directly mixed with the fresh oil passing through the oil groove and used together for developing the oil film. As a consequence, the proportion of the engine power required to drive the oil pump is reduced, by which the consumption of the engine and thus its $CO_2$ emission will be reduced. Preferably this inventive plain bearing shell is used in the crankshaft main bearing. The oil bore can have a circular cross-section and can be made with a drill or can be an elliptical cross-section or a slot and be milled. In a further development, the plain bearing according to the invention comprises a distributor groove extending on an inside of the plain bearing shell primarily in circumferential direction of the plain bearing shell to distribute the inserted oil inside the plain bearing shell, whereby the oil bore leads into the distributor groove. The oil distribution inside the plain bearing shell will be improved, so that an uniform oil film is created all over in the plain bearing shell for supporting the shaft.

Preferably, the distribution groove ends in circumferential direction with a first distance in front of a first circumferential end of the plain bearing shell. Thus, the load-bearing surface and therefore the load capacity of the plain bearing shell are increased therefore, whereby larger loads can be supported.

In a preferred configuration of the plain bearing shell according to the invention, the collector groove ends in the circumferential direction with a second distance in front of a second circumferential end of the plain bearing shell. And thereby the bearing surface and the load capacity can be increased further, so that larger loads can be supported.

In a favoured further development, both the distributor groove with a first angular dimension between 50° and 100° and the collecting groove with a second angular between 40° and 80° extend in circumferential direction. Therefore, the angular dimension has to be selected so, that there is always a distinct distance between the distribution groove and the collecting groove. It has been found that in this region of the first and second angular dimensions, the volumetric flow rate of the oil inserted into the plain bearing and therefore also the fuel consumption of the engine can be reduced substantially strong.

Preferably, the first and the collecting groove are substantially of the same length. This simplifies the manufacture, because the first and the collecting groove can be manufactured by using an identical work step. Only the position of the plain bearing shell has to be modified, thus the plain bearing shell is producible at a favourable price.

In an advantageous development of the plain bearing shell, the first and collecting groove each have a length-to-width ratio of 10:1 to 40:1. It has been found that in this region of the length-to-width ratio, the volumetric flow rate of the oil inserted into the plain bearing and therefore also the fuel consumption of the engine can be very severely reduced.

It has also been found to be particularly advantageous for the reduction of the volumetric flow rate of the oil inserted into the plain bearing and of fuel consumption of the engine, if the first and the collecting groove each have a width-to-depth ratio of 10:1 to 40:1.

Preferably, at least the collecting groove merges with a first radius in circumferential direction into the load-bearing surface or into a groove base. As indicated above, a lower pressure is developed in the oil film, whereby a suction effect is generated in the collecting groove. Due to in this embodiment the collecting groove merges into the load-bearing surface via a first radius, no or at least less turbulences emerges, which could disturb the suction effect and flow into the collecting groove. If both the first and the collecting groove are manufactured in accordance with a circular segment-shaped cross-section, the manufacture is simplified further. Even the transition into the groove base by means of the first radius reduces the turbulence inside the oil film, so that the suction effect may develop more efficiently.

Advantageously, at least the collecting groove has in circumferential direction a substantially circular segment-shaped profile course at the groove base with a second radius. The transition from the load-bearing surface into the collecting groove along the longitudinal axis is very gentle designed, so that no or at least less turbulences are created in the oil film, which could disturb the suction effect and flow into the collecting groove. Furthermore, the manufacture of the collecting groove in this formation is very simple, as the appropriate cutting tool needs only to be rotated and not moved laterally. For instance, the grooves may be manufactured by means of a rotating milling head, which removes the material with its peripheral surface. If both the distribution groove and the collecting groove are manufactured in accordance with a circular segment-shaped cross-section, the manufacture is simplified further. The use of 'substantially circular' is therefore used, that, on the one hand, a strictly circular profile course cannot be produced due to the usual manufacturing inaccuracies. On the other hand, it is possible to manufacture the oil grooves before bending, i.e. in the flat state of the plain bearing shell. An in flat state circular segment-shaped profile course in the groove base would be geometrically modified through the rolling and run no longer strictly circular segment-shaped. In this respect, all shapes, created solely by rotating the cutting tool around an axis being relative to the plain bearing shell in its position unchanged, should be included with the feature "in circumferential direction a primarily circular segment-shaped profile course".

Preferably, at least the collecting groove merges perpendicular to the circumferential direction with a third radius into the load-bearing surface. Also hereby, turbulences are at least reduced so that the suction effect and the flow of the oil into the collecting groove are not or at least less disturbed.

Preferably, the distribution groove and the collecting groove have the same profile courses in circumferential direction and/or perpendicular to the circumferential direction.

Hereby, the plain bearing shell manufacture is simplified, because the same tool can be used to manufacture the first and second groove. There is no need to change the tool holder or arrange a second tool holder.

A further development of the plain bearing shell according to this invention is characterised in that the distribution groove and the collecting groove are connected by a channel. This channel has preferably a significant smaller cross-section compared to the distribution groove and the collecting groove, so that the suction effect is only slightly affected. Oil may collect in the channel, which is available when needed. By rotating the shaft, the oil collected in the channel is entrained and forms a wedge-shaped oil film, through which the plain bearing load capacity can be increased.

THE DRAWINGS

The invention is explained below with reference to the accompanying drawings based on preferred examples in detail. Shown by FIG. 1 is a first embodiment of a plain bearing shell according to the invention in unrolled state, FIG. 2 is the first embodiment shown in FIG. 1 in a perspective view, FIG. 3 is a second embodiment of the plain bearing shell according to the invention based on a top view in the unrolled state, FIG. 4 is a cross-section of the second embodiment shown in FIG. 3 alongside the sectional plane A-A defined in FIG. 3, FIG. 5 is a third embodiment of the plain bearing shell according to the invention based on a cross-section similar to the drawing used in FIG. 4 in unrolled state, FIG. 6 is a cross-section of the second embodiment alongside the sectional plane B-B defined in FIG. 3, FIG. 7 is the third embodiment shown in FIG. 5 in rolled state, FIG. 8 is a fourth embodiment of the plain bearing shell according to the invention based on a top view in the unrolled state, and FIG. 9 is a fifth embodiment of the plain bearing shell based on a top view in unrolled state.

DETAILED DESCRIPTION

The first embodiment of the plain bearing shell $10_1$ according to the invention shown in FIG. 1 is shown in the unrolled, flat state based on a cross-section. During the manufacture of a plain bearing, there is a bending step whereby the flats plain bearing shell $10_1$ is bent, so that it forms a half shell, with an angle of approx. 180° (cf. FIG. 7). Two plain bearing shells $10_1$ form a complete bearing, whereby both plain bearing shells do not necessarily have to be set up identically.

FIG. 2 shows the first embodiment of the plain bearing shell $10_1$ based on a perspective view. It is already bent and can be used already with a second plain bearing shell to mount a non-illustrated shaft.

The plain bearing shell $10_1$ comprises a distribution groove 12, which extends on an inside 14 of the plain bearing shell $10_1$ in circumferential direction of the plain bearing shell $10_1$. To define the circumferential direction it is illustrated in FIG. 3 with the line X. The largest extension of the distribution groove 12 should be in circumferential direction. An oil bore 16 is provided in the distribution groove 12, which radially passes through the plain bearing shell $10_1$ and through which oil can be supplied via a non-illustrated oil pump or injected into the distribution groove 12.

Furthermore, the plain bearing shell $10_1$ features a collecting groove 18, which also extends on the inside 14 in circumferential direction of the plain bearing shell $10_1$. The relevant versions concerning the extension of the distribution groove 12 shall apply congruently for the collecting groove 18. The collecting groove 18 is closed on all sides and surrounded by a load-bearing surface 20. The load-bearing surface 20 is each surface of the inside 14 of the plain bearing shell $10_1$ on which an oil film can build up for mounting and sliding a non-illustrated shaft. The direction of rotation of the shaft is illustrated with the arrow V. Thus, it can be seen that the collecting groove 18 is arranged in rotational direction of the shaft in front of distribution groove 12.

FIG. 3 shows a second embodiment $10_2$ of the plain bearing shell according to the invention based on a top view, which is substantially different from the first embodiment in terms of dimensions. The plain bearing shell $10_2$ has a total width $b_{ges}$ and a total height $h_{ges}$ (cf FIG. 4). The distribution groove 12 has a first distance $A_1$ of a first circumferential end 22 and the collecting groove 18 a second distance $A_2$ from a second circumferential end 24 of the plain bearing shell $10_1$. The distribution groove 12 and the collecting groove 18 have a third distance $A_3$ between their ends pointing towards each other and thus, they are arranged behind one another in circumferential direction. For the sake of clarity, the load-bearing surface 20, which surrounds the distributor groove 12 and the collector groove 18 on all sides is pictured hatched. In contrast to the embodiment shown in FIG. 1, the oil bore $16_1$ is designed as a slot.

The distributor groove 12 features a first length $l_1$, a first width $b_1$ and a first depth $t_1$ while the collector groove 18 features a second length $l_2$ a second width $b_2$ as well as a second depth $t_2$. The depths should indicate the maximum distance between the load-bearing surface 20 surrounding the distributor groove 12 and the collector groove 18 and a groove base 28. In accordance with the second embodiment, the distributor groove 12 and the collector groove 18 have identical dimensions, meaning that the lengths $l_1$ and $l_2$, the widths $b_1$ and $b_2$ as well as the depths $t_1$, $t_2$ each are the same.

As shown in FIG. 4, the distributor groove 12 and the collector groove 18 transition in circumferential direction 15 with a first radius $r_1'$ from the load-bearing surface 20 into an inclined section 26 opposite the load-bearing surface 20. The inclined section 26 also transitions with a first radius $n_1''$ into the groove base 28 of the distributor groove 12 and the collector groove 18. The first radii $r_1'$, $r_1''$ can be identical, or can be different. Furthermore, the distributor groove 12 and/or the collector groove 18 can be manufactured without the first radius $r_1$.

In FIG. 6, the plain bearing shell $10_2$ is illustrated in accordance with the second embodiment along the sectional plane B-B defined in FIG. 3. The collector groove 18 merges perpendicular to the circumferential direction with a third radius $r_3$ into the load-bearing surface 20. In the example shown, the collector groove 18 is arranged perpendicular to the base of groove 28, whereby a transition with the third radius $r_3$ or with a different radius is also conceivable. Of course, other transitions, for example as a chamfer, can be envisaged.

FIG. 5 illustrates a third embodiment of the plain bearing shell $10_3$, according to the invention, in the manner chosen for illustration in FIG. 1. The structure of this third embodiment differs primarily from the first one in that the distributor groove 12 and the collector groove 18 have in circumferential direction a circular segment-shaped profile course with a second radius $r_2$. The profile courses of the distributor groove 12 and the collector groove 18 are identical, meaning that lengths $l_1$ and $l_2$ are also identical.

FIG. 7 illustrates plain bearing shell $10_3$ in accordance with the third embodiment in rolled and therefore in installable condition, in which it overlaps an angle of approx. 180° between the first circumferential end 22 and the second circumferential end 24. It can be seen from this that, in rolled state, the distributor groove 12 with a first angular dimension α and the collector groove 18 with a second angular dimension β both extend in circumferential direction such that the angle dimensions only relate to the rolled condition of the plain bearing shell $10_3$ shown here.

The angular dimension corresponds to the angle enclosed of two normals N that extend from the respective ends of the distributor groove 12 and the collector groove 18 and that are located on the same sectional plane. In FIG. 7, these normals are $N_{11}$ to $N_{22}$, whereby the angular dimension of the distributor groove 12 is described by the normals $N_{11}$ and $N_{12}$ and the angular dimension of the collector groove 18 is described by the normals $N_{21}$ and $N_{22}$. The distributor groove 12 and collector groove 18 end at the point where they merges into the load-bearing surface 20. As the lengths $l_1$, $l_2$ of the collector groove 12 and of the distributor groove 18 are identical (cf. FIG. 5), the first and second angular dimensions α and β are also identical, although different dimensions can be envisaged here.

FIG. 8 illustrates a fourth embodiment of the plain bearing shell $10_4$ according to the invention in a top view in its unrolled flat state. In this embodiment the plane bearing shell $10_4$ does not have a distributor groove. Instead, oil bore 16 merges directly into the load-bearing surface 20.

FIG. 9 illustrates a fifth embodiment of the plain bearing shell $10_5$ that constitutes the subject of this invention in a top view in its unrolled flat state. In this embodiment the plain bearing shell $10_5$ comprises several collector grooves, in this case three collector grooves $18_1$ to $18_3$, characterised by different lengths $l_{21}$ to $l_{23}$ as well as different widths $b_{21}$ to $b_{23}$.

In all of these embodiments, the collector grooves 18, relative to the rotational direction of the shaft identified with arrows V, are arranged in front of oil bore 16 and/or distributor groove 12. This has the effect that the oil collected in the collector groove 18 is supplied to the oil bore 16 or to the distributor groove 12 as a result of the rotational movement and the associated drag action of the shaft. In this way, the oil already in the plain bearing shell 10 is mixed with fresh oil that is delivered through the oil bore in the plain bearing shell 10, where it is collected and can be reused. The volume of fresh oil can be reduced by the volume of oil collected in collector groove 18. Further to this, the oil pump is only required to move oil at a smaller volumetric flow rate, requiring less power, which in turn gives rise to a fuel saving in the engine that powers the unit. The $CO_2$ balance is improved accordingly.

The invention claimed is:

1. A plain bearing shell in form of half shell which covers an angle of about 180° with an oil bore that passes radially through the plain bearing shell to insert oil into the plain bearing shell, including at least one collector groove which extends on the inside of the plain bearing shell in a circumferential direction for collecting oil located in the plain bearing shell, which is closed and completely surrounded on all sides by a load-bearing surface, and including a distributor groove extending on the inside of the plain bearing shell primarily in the circumferential direction of the plain bearing shell for distributing the inserted oil inside the plain bearing shell, whereby the oil bore leads into the distributor groove.

2. The plain bearing shell according to claim 1, wherein the distributor groove ends in the circumferential direction with a first distance ($A_1$) in front of a first circumferential end of the plain bearing shell.

3. The plain bearing shell according to claim 2, wherein the collector groove ends in the circumferential direction with a second distance ($A_2$) in front of a second circumferential end of the plain bearing shell.

4. The plain bearing shell according to claim 1, wherein both the distributor groove with a first angular dimension ($\alpha$) between 50° and 100° and the collector groove with a second angular dimension ($\beta$) between 40° and 80° extend in the circumferential direction.

5. The plain bearing shell according to claim 1, wherein the distributor groove and the collector groove are substantially of the same length.

6. The plain bearing shell according to claim 1, wherein the distributor groove and the collector groove each have a length-to-width ratio of 10:1 to 40:1.

7. The plain bearing shell according to claim 1, wherein the distributor groove and the collector groove each have a width-to depth ratio of 10:1 to 40:1.

8. The plain bearing shell according to claim 1, wherein the at least one collector groove merges with a first radius ($r_1$) in the circumferential direction into the load-bearing surface and/or into a groove base.

9. The plain bearing shell according to claim 8, wherein the at least one collector groove has in the circumferential direction a substantially circular segment-shaped profile course at the groove base with a second radius ($r_2$).

10. The plain bearing shell according to claim 8, wherein at least the collector groove merges perpendicular to the circumferential direction with a third radius ($r_3$) into the load-bearing surface.

11. The plain bearing shell according to claim 1, wherein the distributor groove and the collector groove have the same profile courses in circumferential direction and/or perpendicular to the circumferential direction.

* * * * *